April 25, 1950 F. N. EATON 2,505,639
TRACTOR LIFT
Filed Oct. 30, 1945 2 Sheets—Sheet 1
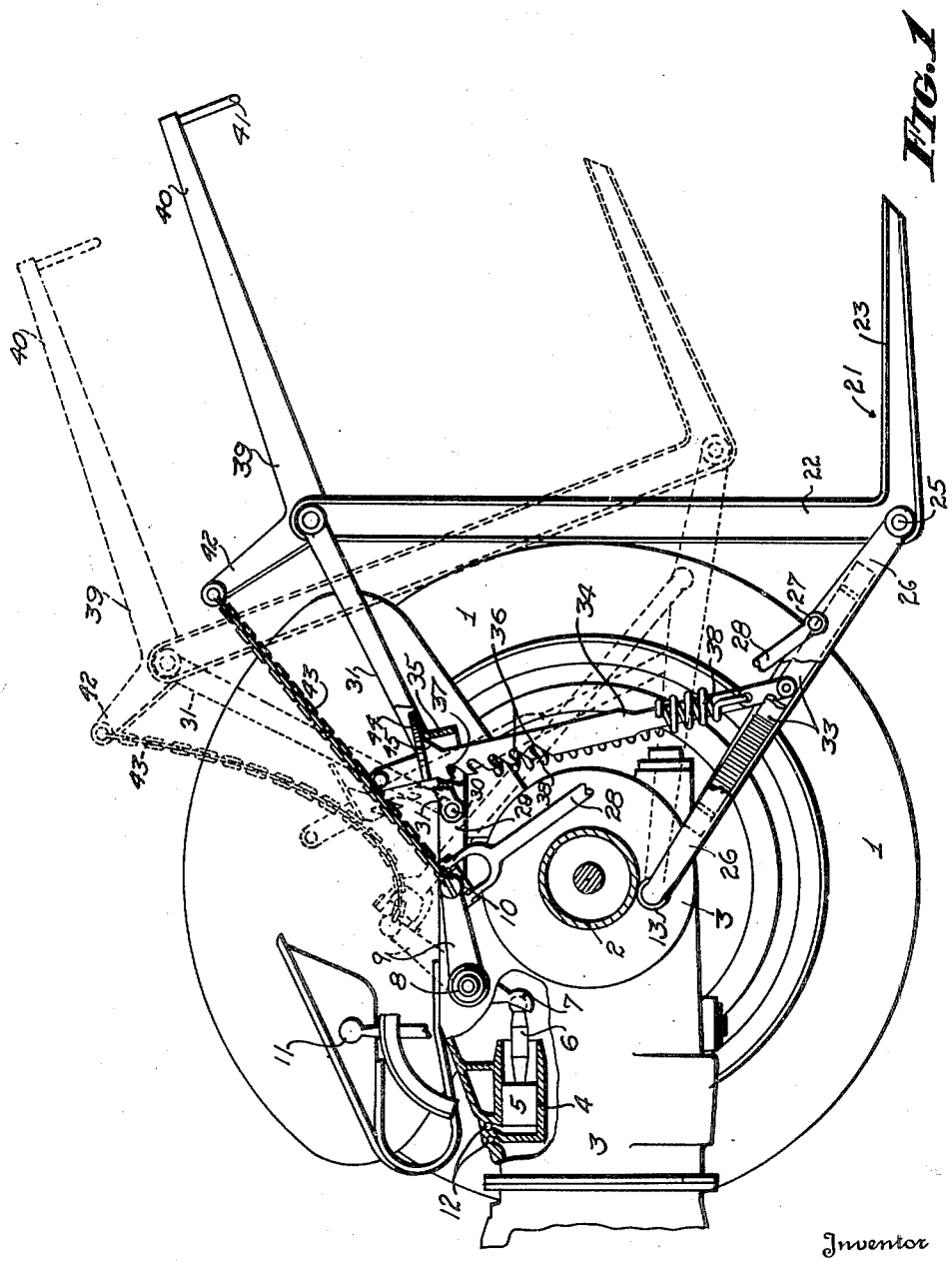
Inventor
Frederic N. Eaton

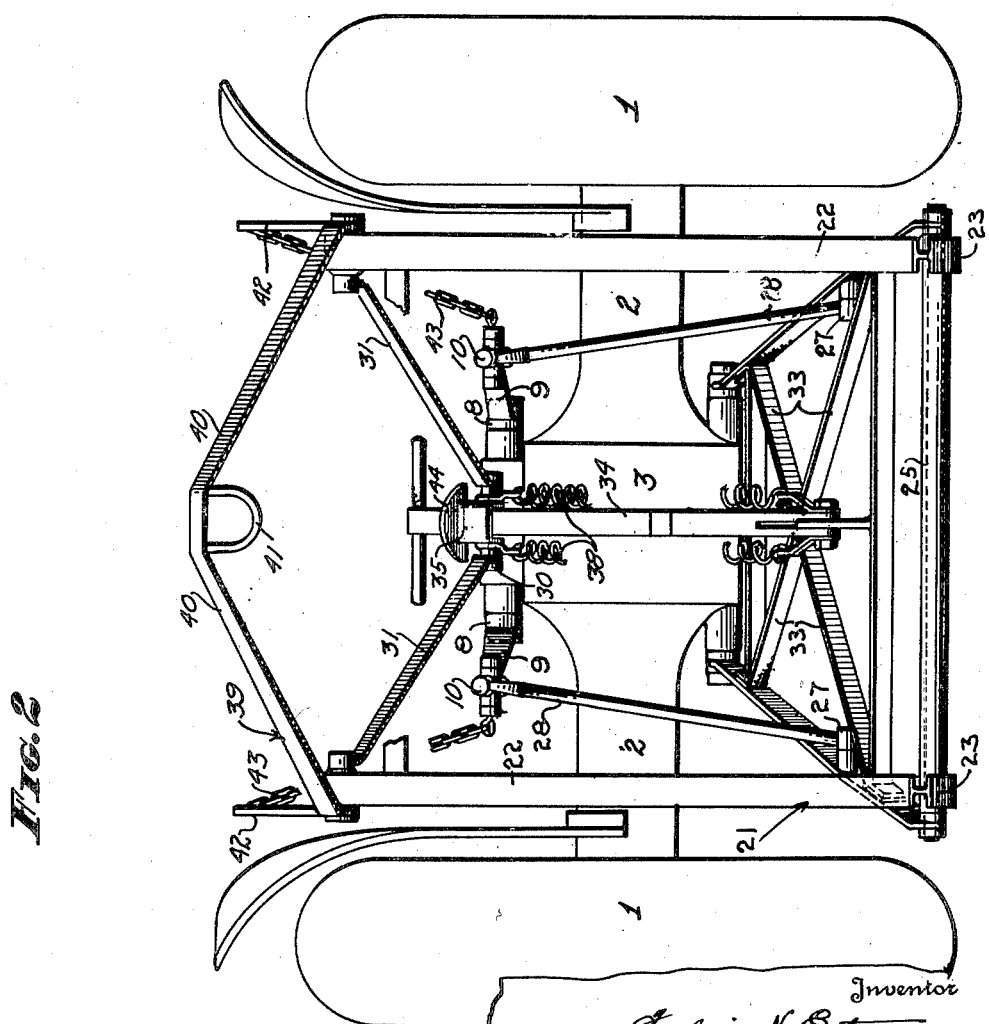

Patented Apr. 25, 1950

2,505,639

UNITED STATES PATENT OFFICE 2,505,639

TRACTOR LIFT

Frederic N. Eaton, Pasadena, Calif.

Application October 30, 1945, Serial No. 625,512

10 Claims. (Cl. 214—131)

(Granted under the act of March 3, 1883, as amended April 30, 1928; 370 O. G. 757)

This application relates to tractor lifts; that is, to attachments for tractors whereby the tractor may be employed as a truck to lift and transport loads.

Among the principal objects of the present invention are:

First, to provide a tractor lift which is particularly designed as an attachment for the hydraulically actuated mechanism commonly known as the "Ferguson tractor hitch".

Second, to provide a tractor lift which is so arranged that a tractor may back up to a load, employ the lift to raise the load, truck the load to the desired point and release it.

Third, to provide a tractor lift wherein the lift is raised and lowered by hydraulic control but is mechanically locked in its raised position so that the stress is removed from the hydraulic system during transportation.

Fourth, to provide a tractor lift in which the load on being raised is likewise tilted to move the center of gravity toward the fulcrum defined by the rear axle of the tractor.

Fifth, to provide a tractor lift which is so positioned that the load is carried clear of the tractor wheels so that the width of the load may be in excess of the tractor width.

With the above and other objects in view as may appear hereinafter, reference is directed to the accompanying drawings in which:

Figure 1 is a side view of my tractor lift showing fragmentarily essential cooperating portions of the conventional Ferguson tractor hitch. The lift being shown by solid lines in its lower position and by dotted lines in its raised position.

Figure 2 is a rear end elevational view of the tractor lift with portions shown fragmentarily to facilitate the illustration.

The tractor depicted in the drawings is the conventional Ford-Ferguson tractor. The tractor includes rear or traction wheels which are connected by an axle housing 2 and a central transmission housing 3. Within or forwardly of the transmission housing 3 is a ram cylinder 4 which receives a piston 5. The piston is joined by a connecting rod 6 and lever 7 to a hydraulic lift shaft 8 which extends transversely that is, parallel with the axle housing and protrudes from the sides of the transmission housing 3. The exposed extremities of the shaft 8 carry lifting levers 9 and universal joints 10. A suitable source of high pressure fluid and valve arrangement represented fragmentarily by the operating handle 11 and ports 12 is employed to control the action of the piston 5. The structure so far described is conventional.

My tractor lift includes an L-shaped carrier frame 21 comprising uprights 22 which are provided at their lower ends with rearwardly extending base arms 23. The uprights are joined together by suitable cross bracing 24 so as to form a rigid structure. The juncture of the uprights 22 and base arms 23 are joined by a cross shaft 25.

Struts 26 are connected to the extremities of the cross shaft 25 and converge rearwardly and upwardly to journals 13 which project radially from the transmission housing 3 below the axle housings 2. These journals constitute a conventional part of the Ferguson tractor hitch. Intermediate the ends of the struts 26 preferably near their extended ends are provided journals 27 which journal the lower ends of elevator links 28 the upper ends of which are connected to the universal joints 10.

Secured to the upper portion of the transmission housing and projecting rearwardly therefrom is an extension 29 which carries a cross pin 30. The extremities of the cross pin journal a pair of upper struts 31 which diverge upwardly and rearwardly to the uprights 22. The lengths of the lower struts 26 and upper struts 31 are so proportioned that when the carrier frame 21 is in its lower position. the uprights 22 extend vertically and the plane defined by their rear sides is disposed rearwardly a slight distance beyond the wheels 1. Upon pivotal movement of the carrier frame about the compound fulcrums of the struts the aforementioned plane of the uprights remains clear of the wheels 1.

The lift frame is raised and lowered by the arcuate movement of the lifting levers 9 acting through the elevator links 28.

It is to avoid continued application on the hydraulic piston and cylinder of the load carried by the lift frame when the tractor is in motion, consequently means are provided to support the lift frame mechanically in its upper position. The lower pair of struts 26 are joined together by rigid cross bracing 33 which affords means for pivotal attachment at a central point of a latch bar 34 which extends upwardly through a loop 35 formed in the extended portion of the extension 29. The front side of the latch bar 34 is provided with a series of notches 36 any one of which engages a latch pin 37 carried by the extension 29. To aid in the support of the lift frame and its load counterbalance springs 38 extend between the cross bracing 23 and the extension 29 along either side of the latch bar 34.

If the tractor lift is to be employed for the transportation of boxes or crates of uniform size it is possible to provide a means for automatically securing such load on the lift. This is accomplished by means of a retainer 29 which comprises a pair of converging arms 40 extending from the journal pins 32 and terminating at their adjacent ends in a depending loop 41 adapted to overhang the rear upper corner of the load. Extending upwardly from the journaled ends of the arms 40 are lever arms 42, the extremities of which are attached by chains 43 to the lifting levers 9. By reason of the tilting movement of the lift frame 21 the distance between the lift levers 9 and the lever arms 42 is greater when the lift frame is in its lower position than when the lift frame is in its upper or tilted position, consequently as the lift frame moves to its lower position the extended ends of the arms 40 are raised moving the depending hook 41 clear of the load. When the lift frame 21 is raised the converging arms 40 are lowered automatically and the loop 41 hooks over the upper rearward corner of the load.

It should be pointed out that because of the fact that the lift frame 21 tilts as it is raised, the retainer 29 may be omitted particularly if the tractor is employed on level ground.

To protect the operator, a guard 44 extends from the upper portion of the latch bar 34. Under the guard 44 is a cam 45 which engages the upper edge of the loop 35 to guide the upper notch of the latch bar onto the pin 37.

Various changes and alternate arrangements may be made within the scope of the appended claims, in which it is my intention to claim all novelty inherent in the invention as broadly as the prior art permits.

The invention described herein may be manufactured and used by or for the Government of the United States of America for governmental purposes without the payment of any royalties thereon or therefor.

I claim:

1. The combination with a tractor having a hydraulic actuator and a pair of levers operated thereby, of a lift structure comprising: a carrier frame occupying a position at the rear of said tractor; and means pivotally connecting said carrier frame to said tractor for movement between a lower and an upper position said means including upper and lower sets of arms pivotally connected to said tractor and to said carrier frame, and links operatively connected with the levers of said actuator, and means including elements on said tractor and lift structure for securing said carrier frame in an elevated position independently of said actuator for relieving the load of said lift structure from said actuator.

2. The combination with a tractor having a hydraulic actuator and a pair of levers operated thereby, of a lift structure comprising: a carrier frame, L-shaped in side aspect, occupying a position at the rear of said tractor; and means pivotally connecting said carrier frame to said tractor for movement between a lower and an upper position said means including upper and lower sets of arms pivotally connected to said tractor and to said carrier frame, and links operatively connected with the levers of said actuator, said arms being so proportioned that said carrier frame occupies a vertical position when lowered and an inclined upper position with the lateral leg of the L-frame inclined upwardly, and means including elements on said tractor and lift structure for securing said carrier frame in an elevated position independently of said actuator for relieving the load of said lift structure from said actuator.

3. The combination with a tractor having a hydraulic actuator and a pair of levers operated thereby, of a lift structure comprising: a carrier frame occupying a position at the rear of said tractor; and means pivotally connecting said carrier frame to said tractor for movement between a lower and an upper position said means including upper and lower sets of arms pivotally connected to said tractor and to said carrier frame, and links operatively connected with the levers of said actuator, a load retainer for said carrier frame including arms overhanging said carrier frame and means connecting said arms to said actuator levers to raise said arms as said carrier frame is lowered and to lower said arms as said carrier frame is raised thereby to engage a load carried on said frame.

4. The combination with a tractor having a hydraulic actuator and a pair of levers operated thereby, of a lift structure comprising: a carrier frame, L-shaped in side aspect, occupying a position at the rear of said tractor; and means pivotally connecting said carrier frame to said tractor for movement between a lower and an upper position said means including upper and lower sets of arms pivotally connected to said tractor and to said carrier frame, and links operatively connected with the levers of said actuator, said arms being so proportioned that said carrier frame occupies a vertical position when lowered and an inclined upper position with the lateral leg of the L-frame inclined upwardly, a load retainer for said carrier frame including retainer arms pivotally mounted at the upper extremities of the upright legs of said L-shaped carrier frame and overhanging the lateral legs thereof, and means connecting said retainer arms to said actuator levers to raise said retainer arms as said frame is lowered and to lower said retainer arms as said frame is raised and inclined thereby to engage a load carried by said frame.

5. The combination with a tractor having a hydraulic actuator and a pair of levers operated thereby, of a lift structure comprising: a carrier frame occupying a position at the rear of said tractor; and means pivotally connecting said carrier frame to said tractor for movement between a lower and an upper position said means including upper and lower sets of arms pivotally connected to said tractor and to said carrier frame, and links operatively connected with the levers of said actuator, and means including elements on said tractor and lift structure for securing said carrier frame in an elevated position independently of said actuator for relieving the load of said lift structure from said actuator, a load retainer for said carrier frame including arms overhanging said carrier frame and means connecting said arms to said actuator levers to raise said arms as said carrier frame is lowered and to lower said arms as said carrier frame is raised thereby to engage a load carried on said frame.

6. The combination with a tractor having a hydraulic actuator and a pair of levers operated thereby, of a lift structure comprising: a carrier frame, L-shaped in side aspect, occupying a position at the rear of said tractor; and means pivotally connecting said carrier frame to said tractor for movement between a lower and an upper position said means including upper and lower sets of arms pivotally connected to said tractor and to said carrier frame, and links operatively connected with the levers of said actuator, said arms being so proportioned that said carrier frame occupies a vertical position when lowered and an inclined upper position with the lateral leg of the L-frame inclined upwardly, and means including elements on said tractor and lift structure for securing said carrier frame in an elevated position independently of said actuator for relieving the load of said lift structure from said actuator, a load retainer for said carrier frame including retainer arms pivotally mounted at the upper extremities of the upright legs of said L-shaped carrier frame and overhanging the lateral legs thereof, and means connecting said retainer arms to said actuator levers to raise said retainer arms as said frame is lowered and to lower said retainer arms as said frame is raised and inclined thereby to engage a load carried by said frame.

7. The combination with a tractor having a hydraulic actuator and a pair of levers operated thereby, of a lift structure comprising: a carrier frame occupying a position at the rear of said tractor; and means pivotally connecting said carrier frame to said tractor for movement between a lower and an upper position said means including upper and lower sets of arms pivotally connected to said tractor and to said carrier frame, and links operatively connected with the levers of said actuator and means including a rigid latch element on said tractor a multiple latch element on said structure, said elements adapted to inter-engage for securing said carrier frame in any of several elevated positions independently of said actuator for relieving the load of said lift structure from said actuator.

8. The combination with a tractor having a hydraulic actuator and a pair of levers operated thereby, of a lift structure comprising: a carrier frame, L-shaped in side aspect, occupying a position at the rear of said tractor; and means pivotally connecting said carrier frame to said tractor for movement between a lower and an upper position said means including upper and lower sets of arms pivotally connected to said tractor and to said carrier frame, and links operatively connected with the levers of said actuator, said arms being so proportioned that said carrier frame occupies a vertical position when lowered and an inclined upper position with the lateral leg of the L-frame inclined upwardly, and means including elements on said tractor and lift structure for securing said carrier frame in an elevated position independently of said actuator for relieving the load of said lift structure from said actuator.

9. The combination with a tractor having a hydraulic actuator and a pair of levers operated thereby, of a lift structure comprising: a carrier frame occupying a position at the rear of said tractor; and means pivotally connecting said carrier frame to said tractor for movement between a lower and an upper position said means including upper and lower sets of arms pivotally connected to said tractor and to said carrier frame, and links operatively connected with the levers of said actuator, a latch bar pivotally connected to the said lower set of arms, said latch bar extending upwardly and having a series of catch elements therein; rigid means carried by the tractor for engagement with a selected catch element thereby to support said carrier frame by said latch bar independently of said actuator.

10. The combination with a tractor having a hydraulic actuator and a pair of levers operated thereby, of a lift structure comprising: a carrier frame occupying a position at the rear of said tractor; and means pivotally connecting said carrier frame to said tractor for movement between a lower and an upper position said means including upper and lower sets of arms pivotally connected to said tractor and to said carrier frame, and links operatively connected with the levers of said actuator, a latch bar pivotally connected to the said lower set of arms; said latch bar extending upwardly and having a series of catch elements therein; rigid means carried by the tractor for engagement with a selected catch element thereby to support said carrier frame by said latch bar independently of said actuator; and counterbalancing springs arranged at opposite sides of said latch bar and anchored to said tractor to support partially the weight of said carrier frame.

FREDERIC N. EATON.

REFERENCES CITED

The following references are of record in the file of this patent:

UNITED STATES PATENTS

| Number | Name | Date |
|---|---|---|
| 1,013,755 | Elsasser | Jan. 2, 1912 |
| 1,500,104 | Carlberg | July 8, 1924 |
| 2,254,292 | Jones | Sept. 2, 1941 |
| 2,311,671 | Larsen | Feb. 23, 1943 |
| 2,323,605 | Johnson | July 6, 1943 |
| 2,330,847 | Seal | Oct. 5, 1943 |
| 2,397,046 | Richey | Mar. 19, 1946 |
| 2,398,585 | Hayward | Apr. 16, 1946 |